(12) United States Patent
Schmidt (10) Patent No.: US 11,215,169 B2
(45) Date of Patent: Jan. 4, 2022

(54) INDUCTIVELY HEATED THERMAL ACTUATOR

(71) Applicant: SAFRAN LANDING SYSTEMS CANADA INC., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 0 days.

(21) Appl. No.: 16/798,114

(22) Filed: Feb. 21, 2020

(65) Prior Publication Data

US 2021/0262451 A1    Aug. 26, 2021

(51) Int. Cl.
    *F03G 7/06*      (2006.01)
    *B64C 25/34*    (2006.01)
    *F03G 7/04*      (2006.01)

(52) U.S. Cl.
    CPC ............... *F03G 7/06* (2013.01); *B64C 25/34* (2013.01); *F03G 7/04* (2013.01)

(58) Field of Classification Search
    CPC .................................. F03G 7/06; B64C 25/34
    USPC .................... 60/508, 513, 527–529
    See application file for complete search history.

(56) References Cited

U.S. PATENT DOCUMENTS

| | | | | |
|---|---|---|---|---|
| 4,583,365 A * | 4/1986 | John | ............... | F28F 13/003 337/119 |
| 5,177,969 A * | 1/1993 | Schneider | ............. | B25J 9/14 60/527 |
| 5,419,133 A * | 5/1995 | Schneider | ............. | B25J 9/14 251/11 |
| 6,931,892 B2 * | 8/2005 | Lee | ............. | D06F 39/083 68/12.14 |
| 8,567,716 B2 | 10/2013 | Schmidt et al. | | |
| 2005/0122194 A1 | 6/2005 | Hintz | | |

FOREIGN PATENT DOCUMENTS

| | | |
|---|---|---|
| DE | 10 2018 105 745 A1 | 9/2019 |
| JP | 2008025764 A | 2/2008 |
| KR | 100237920 B1 | 1/2000 |

OTHER PUBLICATIONS

Written Opinion of the International Searching Authority dated May 20, 2021, issued in corresponding International Application No. PCT/CA2021/050196, filed Feb. 19, 2021, 5 pages.
International Search Report dated May 20, 2021, issued in corresponding International Application No. PCT/CA2021/050196, filed Feb. 19, 2021, 3 pages.

* cited by examiner

*Primary Examiner* — Hoang M Nguyen
(74) *Attorney, Agent, or Firm* — Christensen O'Connor Johnson Kindness PLLC (57) ABSTRACT

A thermal actuator includes a piston slidingly within a cylinder. The piston cooperates with the cylinder to define a cavity. The piston also includes a rod extending away from the cavity. A magnetic field generator selectively imparts an alternating magnetic field to the cylinder, and inductively heats a heating element mounted within the cavity. The cavity also includes a volume of a phase-change material, which is melted by the heating element. The melting phase-change material expands to drive the rod from a retracted position to an extended position.

15 Claims, 5 Drawing Sheets

INDUCTIVELY HEATED THERMAL ACTUATOR

BACKGROUND

Thermal actuators, also known as wax motors, are linear actuators that utilize the phase-change characteristics of wax or other materials to convert heat into linear motion. When wax changes from a solid to a liquid, the volume increases approximately 5% to 20%. In a thermal actuator, a solid wax is enclosed in a cylinder with a piston. The wax is heated, causing the wax to melt and expand, thereby applying a force to the piston to create linear motion. When the heat source is removed, the wax cools and solidifies. As the wax solidifies, it returns to its original volume, and the piston, typically aided by a return spring, returns to its original position. Large actuation forces, simplicity, smooth extension, reliability, and cost make thermal actuators suitable for a number of different applications.

Figure 1:
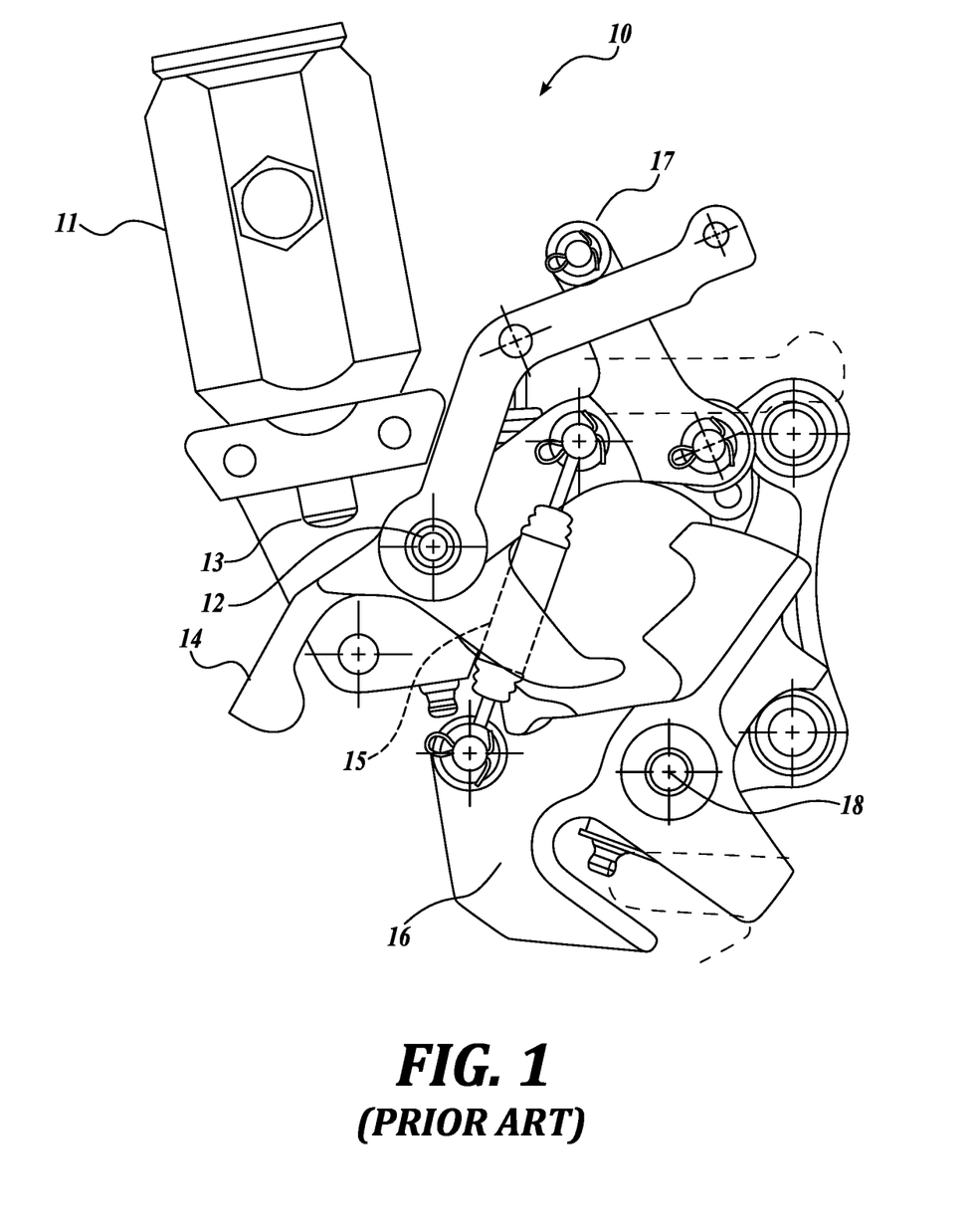
FIG. 1 is a side view of a known landing gear uplock assembly with a thermal actuator.

U.S. Pat. No. 8,567,716, issued to Schmidt et al., and currently assigned to Safran Landing Systems, Canada Inc., the disclosure of which is expressly incorporated herein, teaches the use of thermal actuators to release the catch member of a landing gear uplock mechanism. Referring to FIG. 1, one such uplock assembly 10 is configured for use with aircraft landing gear and landing gear doors. The orientation of the landing gear uplock assembly 10 is illustrated in FIG. 1 as it would be mounted in the landing gear bay. In operation, in order to lock the landing gear (not shown) in a stowed position during flight, the gear retracts into the spring-loaded catch hook 16, which pivots upwards (counter-clockwise) about a first pivot point 18. In order to release the landing gear, the heating mechanism of the thermal actuator 11 heats wax contained within the thermal actuator. Heating the wax causes volumetric expansion of the wax, which in turn exerts a force against the piston 13 of the thermal actuator 11. The force drives the piston 13 to extend and to pivot the uplock release mechanism 14 about a second pivot point 12. When the wax is cooled (e.g. by drawing heat out of the wax via the heating mechanism), the volume of the wax within the chamber decreases, allowing retraction of the piston 13. Once the gear has been released, the tension from a resilient biasing means such as a spring 15 returns the catch hook 16 to the unlocked state (the catch hook 16 then pivots clockwise about the first pivot point 18). The gear can also be unlocked if electric systems fail by pulling on a manual cable release 17 coupled to the uplock release mechanism 4.

One difficulty encountered with known thermal actuators is delivering heat to melt the wax. Most known thermal actuators provide heat through the cylinder of the actuator or by immersing a heater within the wax. Heating the cylinder is inefficient because the external heater must transfer heat by conduction to the wall of the cylinder and then by conduction to the paraffin within. Additionally, heating the cylinder causes the cylinder to expand, increasing the internal volume of the actuator and decreasing the potential work done by expansion of the paraffin.

Immersing a heater within the paraffin also presents challenges. The electrical connections of the heaters must extend through the cylinder, requiring that the path of the electrical connections be sealed and resistant to the actuating pressure produced by the melting wax. Further, the actuator, wax, and heater must be assembled without air gaps. In some cases, it may not be possible to expose the heating element directly to the wax, which delays the heating time. Additionally, the heater may be some distance from the furthest areas of wax, resulting in long heating time to melt all of the wax.

Accordingly, there is a need for improved thermal actuator that provides a simple, reliable, and efficient configuration for melting wax within the cylinder of the actuator.

SUMMARY

A first embodiment of a disclosed thermal actuator comprises a cylinder and a piston slidingly disposed within the cylinder. The cylinder and the piston define a cavity, and the piston comprises a rod extending away from the cavity. A phase-change material is disposed within the cavity. The thermal actuator further comprises a magnetic field generator configured to provide an alternating magnetic field. An electrically conductive element is mounted within the cavity and is exposed to the alternating magnetic field. The electrically conductive element heats the phase-change material, which expands to drive the rod from a retracted position to an extended position.

In one embodiment, the phase-change material comprises a wax.

In one embodiment, the magnetic field generator comprises a coil surrounding the cylinder.

In one embodiment, the coil comprises an electrically conductive wire.

In one embodiment, the coil comprises an electrically conductive tube configured to receive a flow of cooling fluid.

In one embodiment, the magnetic field generator further comprises a power source operably coupled to the coil and a controller selectively controlling a supply of an alternating current from the power source to the coil.

In one embodiment, the controller is a switch.

In one embodiment, the controller is programmed to selectively control the supply of the alternating current from the power source to the coil.

In one embodiment, the electrically conductive element is a cylinder mounted to one of the piston and the cylinder.

In one embodiment, the cylinder includes a hollow interior portion in fluid communication with the cavity.

In one embodiment, an uplock assembly for retaining and releasing a landing gear component includes a thermal actuator, wherein the rod of the thermal actuator releasably engages an uplock release mechanism when the rod is in the extended position, and engagement of the rod with the uplock release mechanism releases the landing gear component.

Another embodiment of a thermal actuator comprises a cylinder and a piston slidingly disposed within the cylinder, wherein the piston and the cylinder define a cavity having a variable volume. A wax is disposed within the cavity, and an inductive heater is configured to selectively heat the wax from a solid state to a liquid state. The inductive heater comprises an alternating magnetic field generator and an electrically conductive target mounted within the cylinder and acted upon by an alternating magnetic field generated by the alternating magnetic field generator.

In one embodiment, the electrically conductive target is a cylinder extending longitudinally through a portion of the cylinder.

In one embodiment, the cylinder includes a hollow interior portion in fluid communication with the cavity.

In one embodiment, the alternating magnetic field generator comprises an electrically conductive coil surrounding at least a portion of the cylinder.

In one embodiment, the alternating magnetic field generator further comprises a power source configured to selectively supply an alternating current to the electrically conductive coil.

In one embodiment, an uplock assembly for retaining and releasing a landing gear component includes a thermal actuator, wherein the rod releasably engages an uplock release mechanism when the rod is in the extended position, engagement of the rod with the uplock release mechanism releasing the landing gear component This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an inductively heated thermal actuator are set forth below according to technologies and methodologies of the present disclosure. In an embodiment, the thermal actuator includes a cylinder and a piston slidingly disposed within the cylinder, which together define a cavity to be filled with a phase-change material, such as wax. In some embodiments, a magnetic field generator is provided that selectively imparts an alternating magnetic field to the cylinder. The alternating magnetic field inductively heats a heating element that is surrounded by the phase-change material. The phase-change material is melted by the heating element. As the phase-change material melts, it expands to drive the piston in a positive linear motion.

Figure 2:
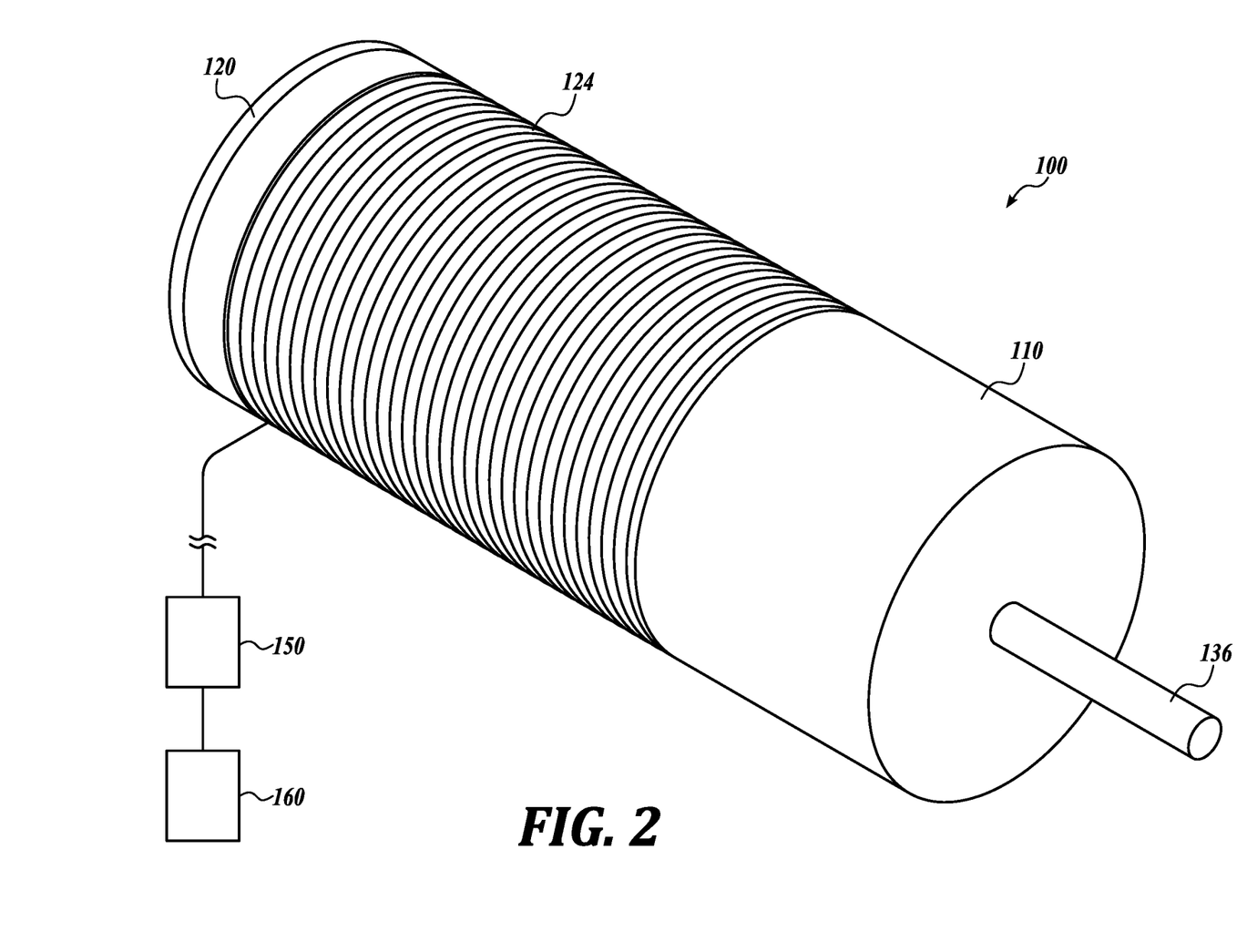
FIG. 2 is an isometric view of a first representative embodiment of a thermal actuator according to the present disclosure, wherein the thermal actuator is suitable for use with the uplock assemblies shown in FIG. 1.
Figure 3:
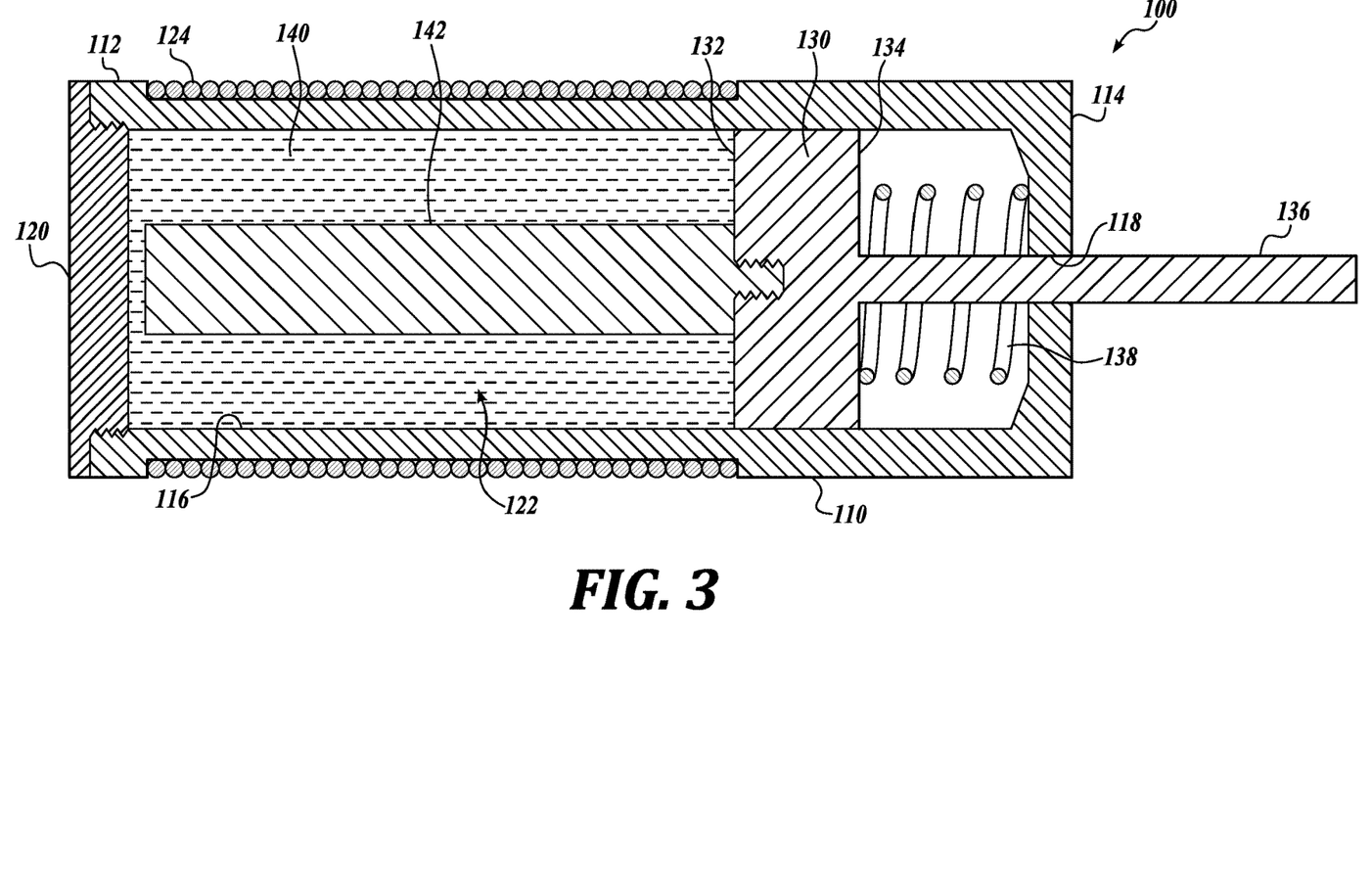
FIG. 3 is a cross-sectional view of the thermal actuator shown in FIG. 2, wherein the thermal actuator is in a retracted position.
Figure 4:
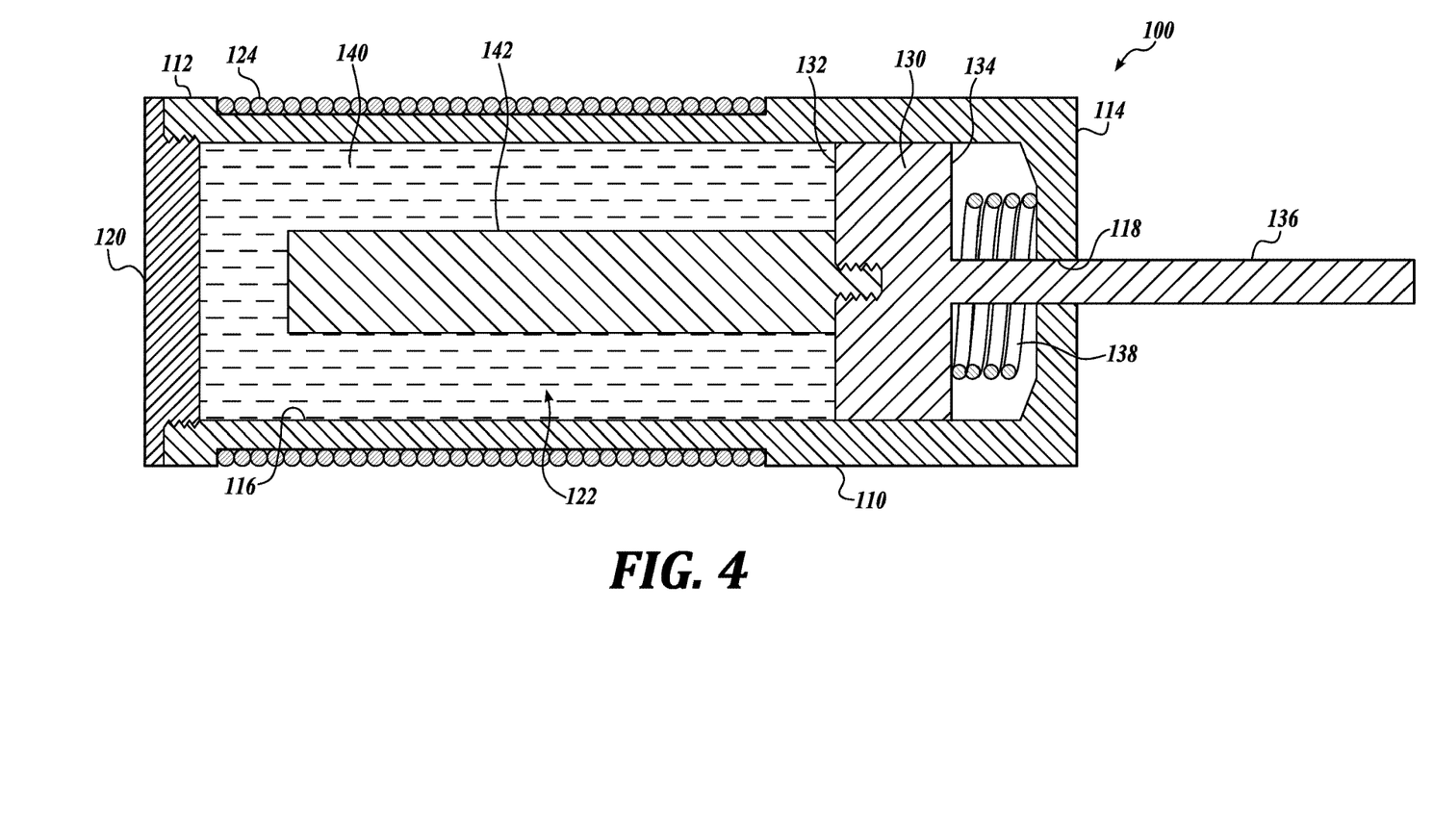
FIG. 4 is a cross-sectional view of the thermal actuator shown in FIG. 2, wherein the thermal actuator is in an extended position.

Referring now to FIGS. 2-4, a first representative embodiment of a thermal actuator 100 according to the present disclosure is shown. The actuator 100 includes a cylinder 110 with an end cap 120 coupled to a first end 112. As best shown in FIGS. 3 and 4, a piston 130 is slidably disposed within cylinder 110. A first side 132 of the piston 130 cooperates with an internal surface 116 of the cylinder 110 and the end cap 120 to define a cavity 122.

A rod 136 extends from a second side 134 of the piston 130 through an aperture 118 formed in a second end 114 of the cylinder 110. As the piston 130 slidingly reciprocates within the cylinder 110, the rod 136 reciprocates between a retracted position, shown in FIG. 3, and an extended position, shown in FIG. 4. In the illustrated embodiment, the rod 136 is shown integrally formed with the piston 130, however, it will be appreciated that alternate embodiments are possible in which the rod and piston are separate components coupled together by mechanical or other suitable means. In some embodiments, the cylinder 110, end cap 120, piston 130, and/or rod 136 are optionally made from electrically non-conductive materials in order to minimize heating by the induction coil 124 described below.

A compression spring 138 is disposed within the cylinder 110 between the second side 134 of the piston 130 and the second end 114 of the cylinder. As the rod 136 and piston 130 move from the retracted position to the extended position, the spring compresses and applies a biasing force that urges the rod and piston toward the retracted position. The spring 138 can be in a neutral, i.e., uncompressed, state when the rod 136 and piston 130 are in the retracted position, or alternatively, the spring can include a preload.

Still referring to FIGS. 3 and 4, a heating element 142, at least a portion of which is electrically conductive, is disposed within the cavity 122. In the illustrated embodiment, the heating element 142 is an elongate cylinder threadedly coupled to the second side 134 of the piston 130 and having an axis that is generally aligned with the axis of the cylinder. It will be appreciated that alternate embodiments of the heating element are possible in which the shape, location, mounting, and/or materials vary from the illustrated embodiment, and such variations should be considered within the scope of the present disclosure.

The cavity 122 further includes a volume of a phase-change material 140. In some embodiments, the phase-change material 140 is of a type that melts and solidifies over a narrow temperature range and that also expands in volume by approximately 5% to 20% when the phase-change material changes phase from a solid state to a liquid state, i.e., when the phase-change material melts. When in the solid state, the volume of phase-change material 140 in some embodiments fills the cavity 122 with the rod 136 in the retracted position. In some embodiments, the phase-change material 140 comprises a wax, a polymeric material, or other materials used in known thermal actuators. In one embodiment, the phase-change material is a paraffin wax; however, it will be appreciated that other waxes and other materials with similar thermal and phase-change properties can be used.

The thermal actuator 100 also includes a magnetic field generator. In the embodiments shown, the magnetic field generator includes an induction coil 124 wrapped around an exterior portion of the cylinder 110. The induction coil 124 is made of an electrically conductive material, such as copper wire or Litz wire. The magnetic field generator further includes a power source 150 and a controller 160 operably coupled to the induction coil 124 and configured to selectively supply an AC current to the induction coil.

The controller 160 is configured to receive an activation signal from a sensor (not shown) or another input device indicating that the actuator is to be activated. The controller 160 is programmed to control the power source 150 to provide an AC current to the induction coil 124 in response to the actuation signal. With the AC current provided to the induction coil 124, the induction coil generates a rapidly varying magnetic field concentrated along the center of the coil. The controller 160 is further configured to receive a deactivation signal from a sensor or another input device, indicating that the actuator is to be deactivated. The controller 160 is further programmed to control the power source 150 to stop the flow of the AC current to the induction coil 124. It will be appreciated that the deactivation signal can be active, i.e., an affirmative signal, or passive, i.e. the actuation signal ceases.

To activate the actuator 100, an activation signal is sent to the controller 160, which controls the power source 150 to provide an AC current to the induction coil 124. The AC current causes the induction coil 124 to produce an electromagnetic field, the strength of which varies constantly due to the constantly changing current in the induction coil. As the varying magnetic field penetrates the heating element 142, the temperature of the heating element increases due to hysteresis and/or eddy-current losses generated in the heating element. The increased temperature of the heating element 142, which is contained within the cavity 122 and is in heat transfer communication (e.g., indirect or direct contact) with the phase-change material 140, melts the phase-change material. As the phase-change material 140 melts, the volume of the phase-change material increases, and the expanding phase-change material applies an actuation force to the piston 130. This actuation force drives the piston 130 and, therefore, the rod 136 from the retracted position of FIG. 3 to the extended position of FIG. 4.

To deactivate the actuator 100, a deactivation signal is sent to the controller 160, which controls the power source 150 to discontinue providing the AC current to the induction coil 124. With the AC current discontinued, the presence of the electromagnetic field and the inductive heating of the heating element 142 also stops. Absent heat from the heating element 142, the phase-change material 140 cools and solidifies. In some embodiments, a thermoelectric cooler, e.g., a Peltier cooler, or other known cooling configurations can be incorporated to reduce the time for the phase-change material 140 to solidify. As the phase-change material 140 solidifies and returns to its original volume, the piston 130 and rod 136 return to the retracted position of FIG. 3, assisted by a force provided by the spring 138.

Figure 5:
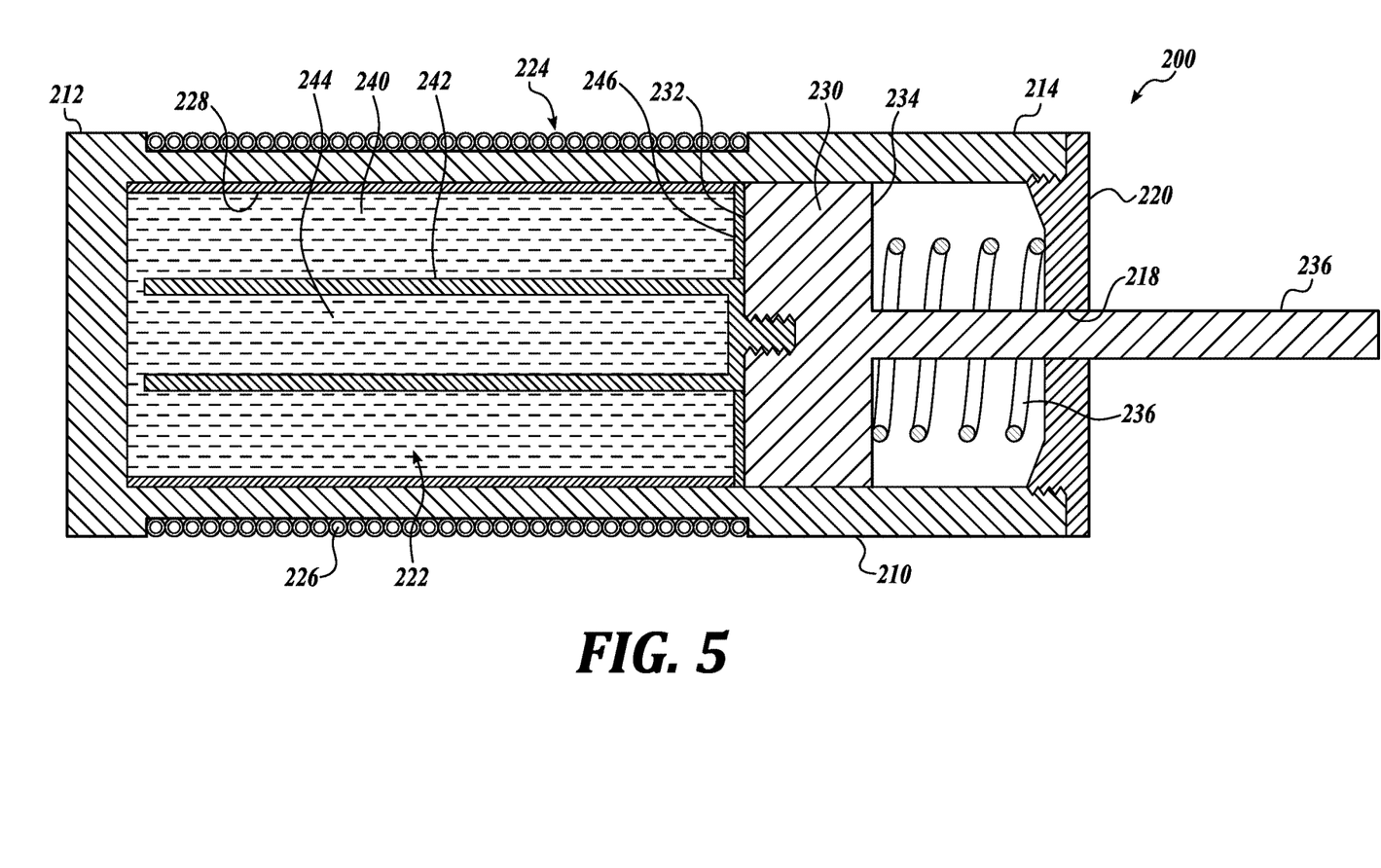
FIG. 5 is a cross-sectional view of a second representative embodiment of a thermal actuator according to the present disclosure, wherein the thermal actuator is in a retracted position.

Referring to FIG. 5, a second embodiment of an actuator 200 according to the present disclosure is shown. The illustrated actuator 200 is similar to the previously described actuator 100 shown in FIGS. 2 and 3, wherein components of actuator 200 identified by reference numbers 2XX correspond to similar components of actuator 100 that are identified by reference numbers 1XX. For the sake of brevity, the similar components will not be described again except to distinguish between various features of the described embodiments.

In order to efficiently facilitate heat transfer from the heating element 242 to the phase-change material 240, it can beneficial to increase the surface area of the heating element that is in contact with the phase-change material. To provide increased surface area, the illustrated heating element 242 is formed as a hollow cylinder. A portion of the phase-change material 240 surrounding the heating element 242 is in contact with and is heated by an outer surface of the heating element. Another portion of the phase-change material 240 is contained within a cavity 244 of the heating element 242 and is heated by an interior surface of the heating element.

It will be appreciated that other heating element 242 configurations with increased surface area are possible. In one embodiment, the heating element has a cross-sectional area that is square, star-shaped, or any other shape. Other embodiments are contemplated in which the heating element 242 incorporates one or more fins extending outwardly from the heating element. Such fins can extend circumferentially around or longitudinally along the heating element 242. These features, alone or in combination with each and with other features suitable for increasing the heat transfer from the heating element 242 to the wax 240 are contemplated and should be considered within the scope of the present disclosure.

While it is desirable to increase heat transfer between the heating element 242 and the phase-change material 240, it may be preferable to minimize heating of the cylinder 210 and the piston 230. As previously described, the cylinder 210 and piston 230 in some embodiments are made from non-conductive materials to prevent or minimize inductive heating by the induction coil 224. To further prevent heating for the cylinder 210, a portion of the interior surface 216 of the cylinder is optionally coated with a non-conductive thermally insulating coating 228 that is not only not heated by inductive heating, but also provides insulation that prevents or reduces heat transfer from the phase-change material 240 to the cylinder. Similarly, a washer 246 or similar device can be positioned in the cavity 222 against the first side 232 of the piston 230 to minimize heat transfer from the phase-change material 240 to the piston. Like the cylinder wall coating 228, the washer 246 in some embodiments is formed from a non-conductive material, such as ceramic or a thermoplastic, to prevent inductive heating by the induction coil 224.

Still referring to FIG. 5, the illustrated induction coil 224 is tubing formed from a conductive material, such as copper. The tubing is capable of conducting the AC current from the power source (not shown) to generate an alternating magnetic field. The tubing also allows for the flow of a cooling liquid 226 that can minimize undesirable heating of the cylinder 210 and coil 224 due to $I^2R$ losses. The cooling fluid also increases the cooling of the wax 240 when the actuator 200 is deactivated, thereby decreasing the time required to return the actuator 200 to its retracted position. It will be appreciated that other embodiments may include tubing without the use of cooling fluid in order to reduce weight. Still other embodiments are contemplated in which the induction coil 224 is a solid wire formed from a conductive material.

The actuator 200 of FIG. 5 also includes an end cap 220 located at the second end 214 of the cylinder 210 instead of the first end 212. The illustrated cylinder 210 also includes a recess formed in the outer surface so that the induction coil 224 is flush with the outer surface of the actuator 200. In one contemplated embodiment a protective sleeve is positioned around the recessed induction coil 224 so that the induction coil is not exposed to the operating environment of the actuator 200. These and other variations to the configuration of the cylinder are contemplated and should be considered within the scope of the present disclosure.

While many embodiments of the technology described above may reference a controller or describe methodologies carried out by a programmable computer or controller, those skilled in the relevant art will appreciate that the technology and methodologies can be practiced on computer/controller systems other than those shown and described above. In embodiments of the present disclosure, the controller 160 and/or the functionality of the controller 160 can be implemented in software or hardware, or a combination of software and hardware. For example, in some embodiments, the technology can be embodied in a special-purpose computer, application specific integrated circuit (ASIC), field programmable gate array (FPGA, controller or data processor that is specifically programmed, configured or constructed to perform the functionality described above.

In an embodiment, the controller 160 may include hardware circuit implementations (e.g., implementations in analog circuitry, implementations in digital circuitry, and the like, and combinations thereof) for implementing the functionality described herein. In another embodiment, the controller 160 herein includes combinations of circuits and computer program products having software or firmware instructions stored on one or more computer readable memories that work together to cause a device to perform one or more methodologies or technologies described herein.

In a certain embodiment, the controller 160 may include one or more processors, a memory, an I/O interface suitably interconnected via one or more communication lines or buses. The memory may include read only memory (ROM), random access memory (RAM), and storage memory, such as a solid state hard drive, flash memory, etc. These examples of computer-readable media can be volatile and non-volatile and removable and non-removable memory implemented in any method or technology capable of storing information, such as computer-readable instructions, data structures, programs, or other data, for implementing aspects of the present disclosure. As used herein, the term processor is not limited to integrated circuits referred to in the art as a computer, but broadly refers to a microcontroller, a microcomputer, a microprocessor, a programmable logic controller, an application specific integrated circuit, and other programmable circuits, among other.

In other contemplated embodiments, the controller 160 may include a switch or a contactor that directly connects the magnetic field generator to the power source. In some embodiments, the power source is an existing 120/208 VAC power source of the type commonly available on aircraft. In other embodiments, the switch includes a thermal shutoff configured to disconnect the magnetic field generator from the power source when a predetermined temperature is exceeded.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A thermal actuator, comprising:
a cylinder;
a piston slidingly disposed within the cylinder, the cylinder and the piston defining a cavity, the piston comprising a rod extending away from the cavity;
a phase-change material disposed within the cavity;
a magnetic field generator configured to provide an alternating magnetic field, the magnetic field generator comprising an electrically conductive coil surrounding the cylinder, wherein the coil comprises a hollow tube configured to receive a flow of cooling fluid;
an electrically conductive solid heating element mounted within the cavity and exposed to the alternating magnetic field, the heating element being configured to increase a temperature of the phase-change material in response to exposure to the alternating magnetic field, wherein the heating element heats the phase-change material, the phase-change material expanding to drive the rod from a retracted position to an extended position.

2. The thermal actuator of claim 1, wherein the phase-change material comprises a wax.

3. The thermal actuator of claim 1, wherein the magnetic field generator further comprises:
a power source operably coupled to the coil; and
a controller selectively controlling a supply of an alternating current from the power source to the coil.

4. The thermal actuator of claim 3, wherein the controller is a switch.

5. The thermal actuator of claim 3, wherein the controller is programmed to selectively control the supply of the alternating current from the power source to the coil.

6. The thermal actuator of claim 1, wherein the heating element has a cylindrical outer surface and is mounted to one of the piston and the cylinder, the outer surface of the heating element being offset from a cylindrical inner surface of the cylinder.

7. The thermal actuator of claim 6, wherein the heating element includes a hollow interior portion in fluid communication with the cavity.

8. An uplock assembly for retaining and releasing a landing gear component, said uplock assembly comprising the thermal actuator of claim 1, wherein the rod releasably engages an uplock release mechanism when the rod is in the extended position, engagement of the rod with the uplock release mechanism releasing the landing gear component.

9. The thermal actuator of claim 1, wherein the heating element is fixedly positioned relative to the piston.

10. A thermal actuator, comprising:
a cylinder;
a piston slidingly disposed within the cylinder, the piston and the cylinder defining a cavity having a variable volume;
a wax disposed within the cavity; and
an inductive heater configured to selectively heat the wax from a solid state to a liquid state, the inductive heater comprising:
an alternating magnetic field generator, the alternating magnetic field generator comprising an electrically conductive coil surrounding the cylinder, wherein the coil comprises a hollow tube configured to receive a flow of cooling fluid; and an electrically conductive solid heating element mounted within the cylinder and acted upon by an alternating magnetic field generated by the alternating magnetic field generator, the heating element being configured to increase a temperature of the phase-change material in response to exposure to the alternating magnetic field.

11. The thermal actuator of claim 10, wherein the electrically conductive heating element is a cylinder extending longitudinally through a portion of the cylinder.

12. The thermal actuator of claim 11, wherein the cylinder includes a hollow interior portion in fluid communication with the cavity.

13. The thermal actuator of claim 12, wherein the alternating magnetic field generator further comprises a power source configured to selectively supply an alternating current to the electrically conductive coil.

14. An uplock assembly for retaining and releasing a landing gear component, said uplock assembly comprising the thermal actuator of claim 10, wherein the rod releasably engages an uplock release mechanism when the rod is in the extended position, engagement of the rod with the uplock release mechanism releasing the landing gear component.

15. The thermal actuator of claim 10, wherein the heating element is fixedly positioned relative to the piston.

* * * * *